United States Patent [19]
Vali et al.

[11] Patent Number: 5,270,538
[45] Date of Patent: Dec. 14, 1993

[54] SYSTEM FOR ACCURATELY DETECTING CHANGES IN TEMPERATURE AND PRESSURE

[75] Inventors: Victor Vali, Laguna Hills; David B. Chang, Tustin; Patrick C. Brownrigg, San Jose, all of Calif.

[73] Assignee: Hughes Aircraft Company, Los Angeles, Calif.

[21] Appl. No.: 860,556

[22] Filed: Mar. 30, 1992

Related U.S. Application Data

[63] Continuation-in-part of Ser. No. 637,575, Jan. 4, 1991, abandoned.

[51] Int. Cl.⁵ .............................................. H01J 5/16
[52] U.S. Cl. ............................ 250/227.18; 250/231.1; 250/227.21; 385/12
[58] Field of Search ............... 250/227.14, 227.17, 250/227.18, 227.19, 227.27, 231.10, 231.19, 227.23, 227.21; 356/345, 32; 350/96.29, 96.33, 96.34; 385/12, 123; 374/161, 162

[56] References Cited

U.S. PATENT DOCUMENTS

| | | | |
|---|---|---|---|
| 4,151,747 | 5/1979 | Gottlieb et al. | 356/32 |
| 4,162,397 | 7/1979 | Bucaro et al. | 250/231.1 |
| 4,201,446 | 5/1980 | Geddes et al. | 350/96.29 |
| 4,295,738 | 10/1981 | Meltz et al. | 356/32 |
| 4,295,739 | 10/1981 | Meltz et al. | 356/32 |
| 4,298,794 | 11/1981 | Snitzer et al. | 250/227.14 |
| 4,375,164 | 3/1983 | Dodge et al. | 73/154 |
| 4,427,263 | 1/1984 | Lagakos et al. | 350/96.33 |
| 4,493,995 | 1/1985 | Adolfsson et al. | 250/227.23 |
| 4,523,092 | 6/1985 | Nelson | 250/227.23 |
| 4,714,342 | 12/1987 | Jackson et al. | 356/44 |
| 4,724,316 | 2/1988 | Morton | 350/96.29 |
| 4,743,113 | 5/1988 | Jubinski | 250/227.19 |
| 4,886,333 | 12/1989 | Hicks | 385/12 |
| 4,929,050 | 5/1990 | Wilson | 250/227.19 |
| 4,940,033 | 7/1990 | Plee et al. | 73/35 |
| 4,979,798 | 12/1990 | Lagakos et al. | 350/96.29 |
| 5,061,847 | 10/1991 | Hazan et al. | 250/227.17 |
| 5,090,818 | 2/1992 | Kleinerman | 250/227.18 |
| 5,102,232 | 4/1992 | Tanabe et al. | 250/227.14 |
| 5,106,202 | 4/1992 | Anderson et al. | 250/231.1 |
| 5,111,525 | 5/1992 | Hartouni | 385/126 |

OTHER PUBLICATIONS

Okamoto et al., "Multimode fiber-optic Mach-Zehnder interferometer and its use in temperature measurement", Applied Optics; vol. 27; No. 15; Aug. 1988; pp. 3085-3087.

Primary Examiner—David C. Nelms
Assistant Examiner—John R. Lee
Attorney, Agent, or Firm—Elizabeth E. Leitereg; Terje Gudmestad; W. K. Denson-Low

[57] ABSTRACT

A system adapted for attachment to a device that undergoes changes in temperature and pressure, and for detecting changes in temperature and pressure in the device comprises a mechanism for attaching the system to the device and an optic device that includes pressure-responsive, temperature-responsive optical fibers that produce signals representative of temperature changes over a first optical frequency band, and of pressure changes over a second, distinctly different optical frequency band, or two or more optic devices, at least one including a pressure-responsive optical fiber, and at least one including a temperature-responsive optical fiber.

3 Claims, 2 Drawing Sheets

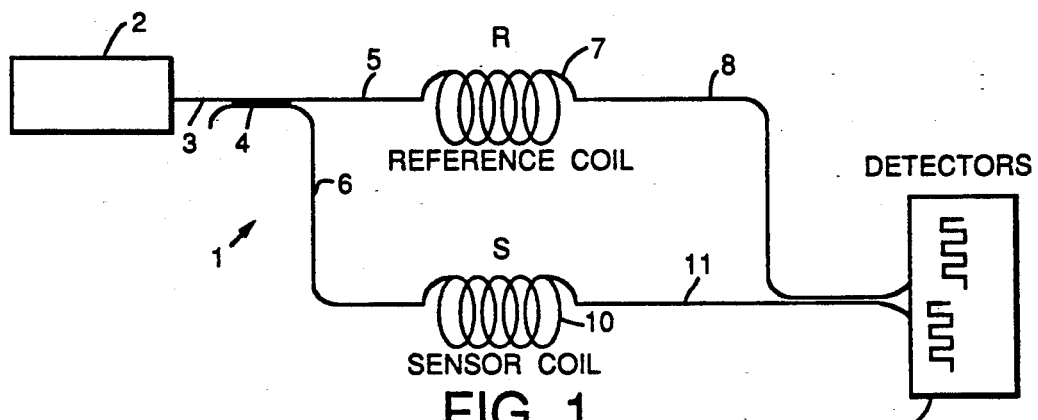
FIG. 1.
FIG. 2.
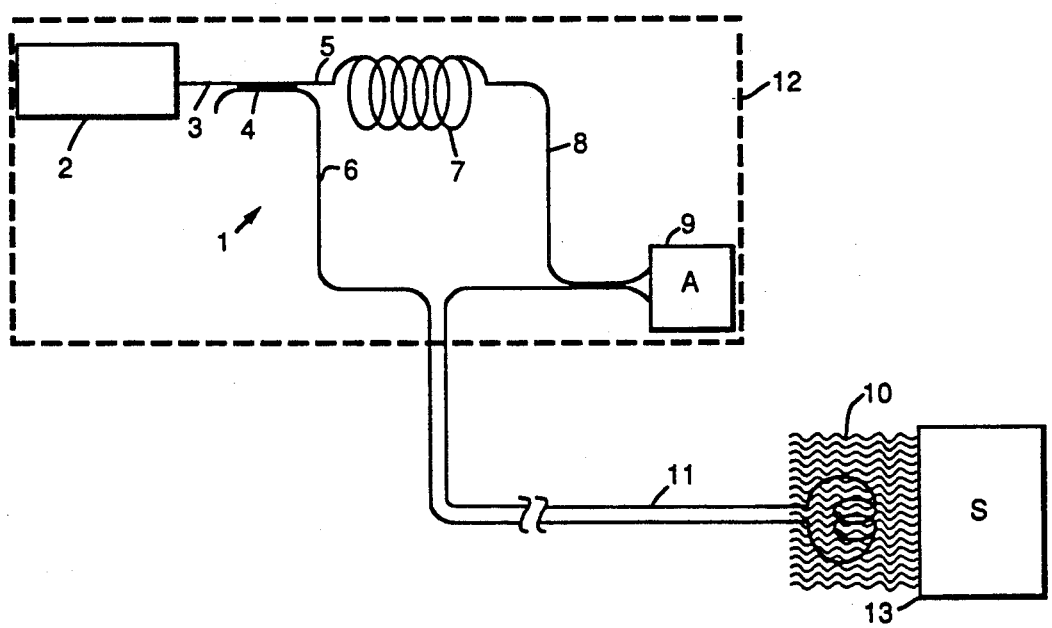
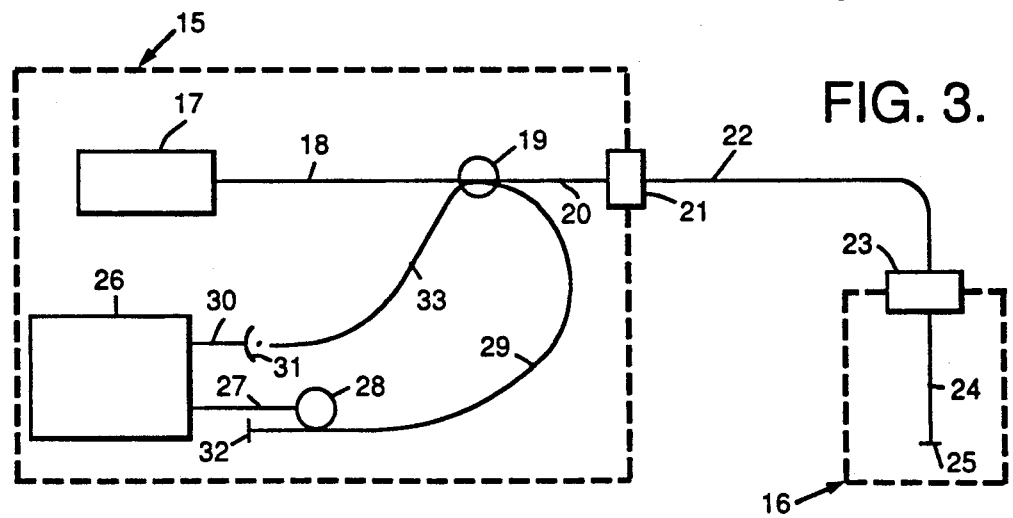
FIG. 3.

SYSTEM FOR ACCURATELY DETECTING CHANGES IN TEMPERATURE AND PRESSURE

This application is a continuation in part of Ser. No. 07/637,575, filed, Jan. 4, 1991, now abandoned.

BACKGROUND OF THE INVENTION

1. Field of the Invention

This invention relates to systems adapted for accurately detecting changes in temperature and in pressure in devices that undergo such changes. These systems include optic fibers that are highly responsive to changes in temperature and in pressure in devices to which they are attached, and that maintain their accuracy over a wide temperature and pressure range, even in environments that contain high electromagnetic interference fields.

2. Description of Prior Art

For some time, a need has existed for a system that can accurately measure temperature and pressure, in a device that undergoes such changes, over a wide temperature and pressure range in environments that are chemically or electrically adverse. Examples of such environments are those surrounding the combustion chamber of an engine and those which contain strong electromagnetic radiation fields. Piezoelectric transducers have been used in such environments, but are adversely affected by the high voltages and currents appearing in such environments, by electromagnetic interference fields, or both.

SUMMARY OF THE INVENTION

This invention relates to systems adapted for attachment to devices that undergo changes in temperature and pressure, and particularly to devices that undergo changes over wide ranges of temperature and pressure, operate at high temperatures and pressures, or both. These systems include means for attaching the system to the devices that undergo such changes, and optic means such as, for example, interferometer means, that include pressure and temperature responsive optical means. In preferred embodiments, these optic fibers produce light signals representative of changes in temperature over a first optical frequency band, and of changes in pressure over a second, distinctly different optical frequency band. In some embodiments, however, the system can include two or more such optic means, one comprising pressure-responsive optic fibers, the other, temperature-responsive optic fibers.

The optic means, in preferred embodiments, comprises interferometer means including a light source, preferably a laser light source, connected to an optical fiber beam splitter. The optical fiber beam splitter, in turn, is connected to an optical fiber path that includes a reference optical fiber coil and a sensor optical fiber coil. Preferably, the reference coil and sensor coil each comprise a pressure-responsive, temperature-responsive optical fiber. The optic means produces light signals representative of temperature changes over a first optical frequency band, and of pressure changes over a second, distinctly different optical frequency band. The interferometer means also includes, in preferred embodiments, a detector means connected to the optic fiber path that includes the reference coil and sensor coil. In preferred embodiments, the detector comprises one or more photodetectors that accurately detect changes in optical frequencies in response to changes in pressure or temperature or both.

In preferred embodiments, the interferometer means is responsive to, and accurately detects changes in temperature over a wide range, preferably over a range of from about minus 40° to about plus 250° centigrade, and accurately determines changes in pressure over a wide range, preferably from about 10 to about 3,000 psi. The degree of accuracy in detecting pressure changes is preferably in the range of about 1% to 10%. The degree of accuracy in detecting changes in temperature is preferably in the range of about 1% to 10%.

In one embodiment, the system of this invention comprises a plurality of interferometer means, at least one including a pressure-sensitive optical fiber coil, and at least one including a temperature-sensitive optical fiber coil.

Among the devices that undergo changes in temperature and pressure to which the interferometer means can be attached are combustion chambers, such as internal combustion chambers in motor vehicles. Combustion chambers in motor vehicles are exposed to, and operate in environments that have high electromagnetic interference, and experience high voltage and current changes, such as those caused by spark plugs. In these environments, the sensor coil is preferably attached to the wall of the combustion chamber or cylinder, and the reference coil, and balance of the interferometer means, is placed remotely from the combustion chamber to isolate the reference coil and balance of the interferometer means from the chamber.

In preferred embodiments, the optical fibers in the interferometer means are responsive to both pressure and temperature. Preferably, these fibers produce signals representative of temperature changes over a first optical frequency band, and of pressure changes over a second, distinctly different optical frequency band. Such fibers, in preferred embodiments, satisfy the condition that $dn/dT$ is approximately equal to $-\alpha n$ where $\alpha$ is the effective thermal expansion coefficient of the optic fiber, n is the refractive index of the fiber and T is the temperature. In such fibers, a 1° C. change in temperature can result in a fringe shift in the range of about 1 to about 10 fringes, while a pressure change of one atmosphere can result in a fringe shift of about 20 to about 200 fringes. Since the fringes shift at different rates for temperature and pressure changes, signals may be provided to indicate temperature changes in a first frequency band and pressure in a second frequency band. Since these fringe changes can be measured to an accuracy of $10^{-4}$, accuracy in the range of about 1% to about 2%, in preferred embodiments, is feasible.

This invention also relates to a method for detecting changes in temperature, pressure or both in devices that undergo changes in temperature, pressure or both comprising attaching, to such a device, an optic device such as an interferometer including a pressure-sensitive, temperature-sensitive optical fiber that produces signals representative of temperature changes over a first optical frequency band, and of pressure changes over a second optical frequency band; monitoring changes in pressure, changes in temperature or both from the signals generated by the fibers and adjusting the conditions in the device that cause changes in temperature, pressure or both in response to the detected changes. In a preferred embodiment, this method, as applied to detecting temperature or pressure changes or both in a combustion chamber, include attaching to the combustion chamber a sensor optic fiber coil that produces signals representative of temperature and pressure changes over different optical frequency bands, or two different sensor optical fiber coils, one responsive to pressure, the other responsive to temperature, and monitoring changes in pressure and temperature in the device through interferometer means that include such sensor coils.

BRIEF DESCRIPTION OF THE DRAWINGS

The systems and methods of this invention can be better understood by reference to the drawings, in which:

FIG. 1 is a schematic diagram of an optic fiber interferometer useful in systems adapted for detecting changes in temperature and pressure in devices that undergo such changes;

FIG. 2 shows the interferometer embodiment of FIG. 1 attached, in schematic form, to an internal combustion engine; and FIG. 3 is a schematic diagram of another embodiment of an optic fiber interferometer useful in systems adapted for detecting changes in temperature and pressure in devices that undergo such changes.

DESCRIPTION OF THE PREFERRED EMBODIMENTS

Figure 4:
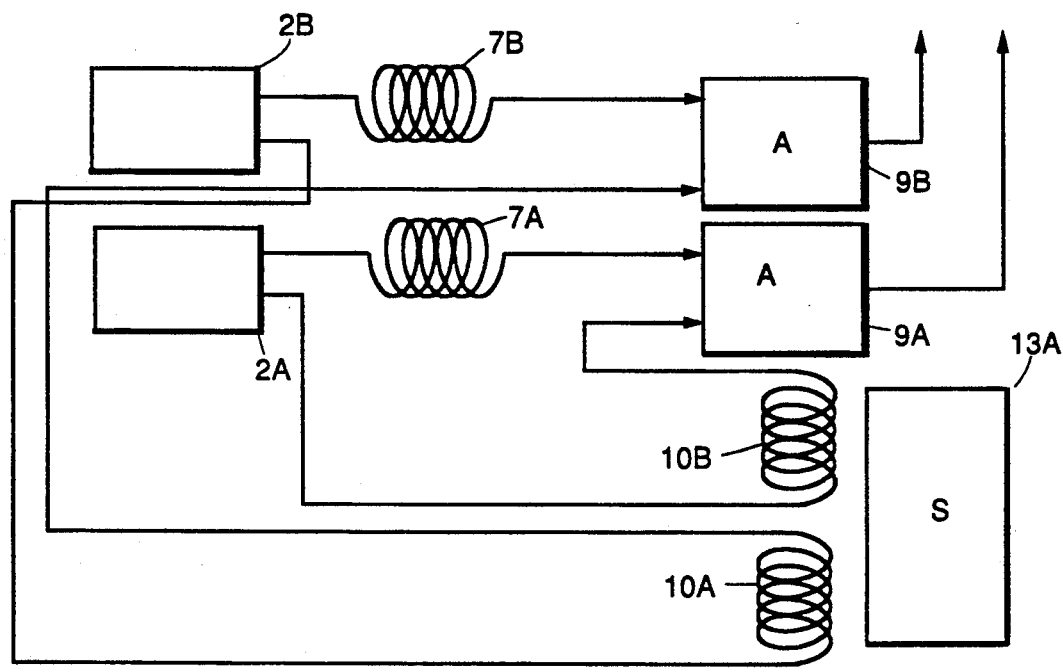
FIG. 4 is a schematic diagram of still another embodiment of the invention used to measure temperature and pressure.

Optical fibers are ordinarily sensitive to both temperature and pressure. When a sensor is built in a form of Mach-Zehnder interferometer the pressure and temperature generates fringe shift, $\Delta Z$, which are as follows:

$$\Delta Z_P = \left( \frac{dn}{dp} + \frac{n}{L_g} \frac{dL_g}{dP} \right) \frac{L_g}{\lambda} \Delta P \tag{1}$$

$$\Delta Z_T = \left( \frac{dn}{dT} + \frac{n}{L_g} \frac{dL_g}{dT} \right) \frac{L_g}{\lambda} \Delta T \tag{2}$$

where n is the index of refraction, Lg is the geometric length, $\lambda$ is the wavelength of the light used, and $\Delta P$ and $\Delta T$ are the pressure and temperature changes. For commercially available fibers the term in parenthesis of eq. (1) is equal to about $10^{-12}$ cm$^2$/dyne. In eq. (2) the term varies for different glasses from $10^{-5}$ $^0C^{-1}$ to $-2.10^{-6}$ $^0C^{-1}$.

Since the fringe position can easily be determined with $10^{-5}$ fringe accuracy, both the temperature and pressure is measurable with sufficient precision $$\left( \frac{\Delta T}{T} < < 10^{25} \text{ and } \frac{\Delta P}{P} < < 10^{25} \right).$$

Further, because of the mass (heat capacity) of 1 cm of fibers is less than a milligram, the inherent response time delays are small, Also conventional quartz optical fibers can tolerate quite high temperatures (T>500° C.).

The total fringe shift $\Delta Z$ is $$\Delta Z = \Delta Z_p + \Delta Z_T \tag{3}$$

Temperature and pressure shifts can be separated if one of the fibers is made with glasses (core and cladding) that make the fiber less sensitive to temperature variation. This condition is satisfied when $$\frac{dn}{dT} \approx -\alpha n \tag{4}$$

where $\alpha$ is the effective thermal expansion coefficient of the fiber.

For example, a 1 cm long fiber mounted in a spark plug in a combustion engine cylinder will have a fringe shift of 0.012 fringes/atm and for a temperature coefficient of $10^{-5\circ}$ C.$^{-1}$ it will have 0.012 fringes/°C.

Pressure variations $\Delta P$ in the combustion cycle are of the order of 800–900 PSI, i.e <100 Atm from equation (1)

$$\Delta Z_P = 10^{-12} \frac{L_g}{\lambda} \Delta P$$

Or using Lg=1 cm, $\lambda = 10^{-4}$ cm and $\Delta P = 100$ Atm$ = 10^8$ dynes/cm$^2$ one gets for $\Delta Z_P$ $\Delta Z_P = 1$ fringe.

Since $\Delta Z$ can be measured with $10^{-5}$ fringe accuracy, one percent accuracy is easily obtained.

FIG. 1 shows an optic fiber interferometer, here a Mach-Zehnder interferometer, that includes laser light source 2 connected to optic fiber path 3. Path 3 is connected to fiber beam splitter 4 which divides the light into two paths, a first path 5 and a second path 6. Light on path 5 passes through reference coil 7 and then through path 8 to detector 9. Light on path 6 passes through sensor coil 10, and then through path 11 to detector 9. At detector 9, differences in the light signals emerging from reference coil 7 and sensor 10 appear as fringe shifts in light that are a function of the changes in temperature, pressure or both imposed upon sensor coil 10.

FIG. 2 shows the interferometer 1 of FIG. 1, in schematic diagram form, attached to an internal combustion engine to determine changes in temperature and pressure in the cylinder of such an engine during operation. Here, interferometer 1 is attached to engine firewall 12. Sensor coil 10 is attached to the outer wall of a cylinder 13 in the internal combustion engine, and is responsive to changes in temperature and pressure in that cylinder. These changes appear on path 11, and are detected at detector 9 as interference patterns, i.e. fringe shifts, when the light on path 11 reaches and interferes with the light on path 8.

FIG. 3 shows an embodiment that is an alternative to the embodiment shown in FIGS. 1 and 2. In this embodiment, opto-electronic module 15 includes laser light source 17 connected to fiber optic path 18 and beam splitter 19. Beam splitter 19 is connected by path 20 to connector 21. Connector 21 is connected via path 22 to engine block connector 23.

Engine block 16 includes at least one cylinder wall into which optic fiber 24 is placed and sealed. Optic fiber 24 terminates in polished mirror surface 25 which minimizes light leakage from fiber 24.

Opto-electronic module 15 also includes signal processor 26. Processor 26 is connected by electrical path 27 to lead/zirconium titanate fiber stretcher 28. Stretcher 28 is connected to beam splitter 19 by fiber optic path 29. Path 29 includes mirrored or polished end surface 32, which minimizes light leakage from fiber 29.

Processor 26 is also connected to beam splitter 19 by electrical connector path 30, photo diode detector 31, and fiber optic fiber light path 33.

In operation, coherent light from laser 17 passes through fiber optic connector 18 to beam splitter 19. From beam splitter 19, light travels on fiber optic path 20 through connector 21, fiber optic path 22, and fiber optic connector 23 into fiber optic fiber sensor 24, which is embedded in a cylinder wall of engine block 16. Light signals representative of changes in temperature, pressure or both, in the cylinder wall where optic fiber 24 is embedded, pass through connector 23, fiber optic path 22, connector 21, optic fiber 20, beam splitter 19, and fiber optic path 33 to photodiode 31, which delivers an electrical signal on path 30 to signal processor 26. The signal on path 30 changes in proportion to changes in temperature, pressure or both that appear as changes in the light signals on optical fiber 24.

Laser light from laser source 17 and fiber optic path 18 and beam splitter 19 also passes fiber optic path 29 to stretcher 28. Processor 26 applies an appropriate voltage on path 27 to stretcher 28. Stretcher 28 delivers a reference light signal to photodiode 31 that maintains photodiode 31 at the appropriate level, preferably halfway between maximum intensity and minimum intensity, to produce the optimum sensitivity in photodiode 31.

FIG. 4 shows another embodiment of the invention wherein temperature and pressure sensitive optical fibers are used to measure temperature and pressure. A temperature sensitive reference coil 7A and sensor coil 10A are coupled to detector 9A to provide fringe shifts indicative of temperature changes in device 13A. A pressure sensertive reference coil 7B and sensor coil 10B are coupled to detector 9B to provide fringe shifts indicative of pressure changes in device 13A. Commercially available pressure and temperature sensitive fibers may be employed. Alternatively, available optical fibers may be employed with modifications (i.e. insulation, etc.) which render the fibers temperature or pressure sensitive.

Although the invention has been described by reference to the embodiments disclosed herein, the invention may be modified or changed depending on specific applications by one skilled in the art without departing from the scope or spirit of the invention.

What is claimed is:

1. An improved system for measuring changes in temperature and pressure for a device, the system of the type including an optical fiber for providing fringe shifts indicative of changes in temperature and pressure, the improvement comprising:

an optical fiber having an index of refraction n such that $dn/dT$ is substantially equal to $-\alpha n$, where $\alpha$ is the effective thermal expansion coefficient of the optical fiber and T is temperature.

2. An optical fiber coil for measuring temperature changes comprising:

an optical fiber having an index of refraction, n, such that $dn/dT$ is approximately equal to $-\alpha n$, where $\alpha$ is the effective thermal expansion coefficient of the optical fiber, and T is temperature, whereby said fiber is responsive to temperature changes over a first frequency band and to pressure changes over a second, different frequency band.

3. A system for measuring changes in the temperature and pressure of a device which under goes temperature and pressure changes, the system including:

a temperature sensitive optical fiber for providing signals indictive of temperature changes for said device; and a pressure sensitive optical fiber for providing signals indicative of pressure changes for said device, wherein each said optical fiber has an index of refraction n and an effective thermal expansion coefficient $\alpha$ such that $dn/dT$ is substantially equal to $-\alpha n$ for each said optical fiber.

* * * * *